US011279416B1

(12) United States Patent
Wurzer et al.

(10) Patent No.: US 11,279,416 B1
(45) Date of Patent: *Mar. 22, 2022

(54) MUD FLAP WEIGHT

(71) Applicants: Adam J. Wurzer, Carroll, IA (US); Terry D. Wurzer, Coon Rapids, IA (US); David T. Wurzer, Carroll, IA (US)

(72) Inventors: Adam J. Wurzer, Carroll, IA (US); Terry D. Wurzer, Coon Rapids, IA (US); David T. Wurzer, Carroll, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/855,340

(22) Filed: Apr. 22, 2020

(51) Int. Cl.
*B62D 25/18* (2006.01)

(52) U.S. Cl.
CPC ........... *B62D 25/18* (2013.01); *B62D 25/188* (2013.01)

(58) Field of Classification Search
CPC .... B62D 25/18; B62D 25/184; B62D 25/186; B62D 25/188; B62D 25/182
USPC ........................................................ 280/851
See application file for complete search history.

(56) References Cited

U.S. PATENT DOCUMENTS

| 3,051,508 | A | * | 8/1962 | Federspiel | B62D 25/188 |
| | | | | | 280/851 |
| 3,473,825 | A | * | 10/1969 | Ochs | B62D 25/168 |
| | | | | | 280/851 |
| 3,830,520 | A | * | 8/1974 | Kelly | B62D 25/188 |
| | | | | | 280/851 |
| 3,877,722 | A | * | 4/1975 | Conner | B62D 25/188 |
| | | | | | 280/154 |
| 4,413,839 | A | * | 11/1983 | McCain | B62D 25/168 |
| | | | | | 280/851 |
| 4,709,938 | A | * | 12/1987 | Ward | B62D 25/18 |
| | | | | | 280/851 |
| 5,050,908 | A | * | 9/1991 | Betts | B62D 25/188 |
| | | | | | 280/851 |
| 5,509,690 | A | * | 4/1996 | Whittington | B62D 25/188 |
| | | | | | 280/847 |
| 5,816,617 | A | * | 10/1998 | Huang | B62D 25/188 |
| | | | | | 280/851 |
| 6,076,842 | A | * | 6/2000 | Knoer | B62D 25/188 |
| | | | | | 224/42.31 |

(Continued)

FOREIGN PATENT DOCUMENTS

GB 2208160 A * 3/1989 ........... B62D 25/188

OTHER PUBLICATIONS

Rock Tamers Mudflap System Instruction Manual; Retrieved by internet archive Mar. 18, 2020; see cols. 4 and 10, Figs. 1 and 10; https://web.archive.org/web/20200318201657/https://www.clearviewaccessories.com.au/wp-content/uploads/2019/03/RT_MANUAL.pdf.*

*Primary Examiner* — Emma K Frick
(74) *Attorney, Agent, or Firm* — Dennis L. Thomte; Thomte Patent Law Office LLC

(57) ABSTRACT

A weight and anti-curling device is provided for a mud flap with the mud flap having an upper end, a lower end, a first side, a second side, a front side and a rear side. The weight of this invention is comprised of a support member. The support member is positioned at the rearward side of the lower end of the mud flap. Bolts extend through the support member and the mud flap to secure the weight to the lower end of the mud flap. The support member may be positioned at the forward side of the mud flap.

4 Claims, 4 Drawing Sheets

(56) References Cited

U.S. PATENT DOCUMENTS

| | | |
|---|---|---|
| 6,729,652 B2 * | 5/2004 | Cicansky ............. B62D 25/188 |
| | | 280/152.3 |
| 10,023,242 B1 | 7/2018 | Wurzer et al. |
| 2003/0116957 A1 | 6/2003 | Cicansky |
| 2012/0051080 A1 | 3/2012 | Wilkerson |

* cited by examiner

MUD FLAP WEIGHT

BACKGROUND OF THE INVENTION

Field of the Invention

This invention relates to a mud flap weight for a truck or trailer and more particularly to a mud flap weight for a truck or trailer which prevents the mud flap from curling.

Description of the Related Art

Flexible mud flaps have long been used on trucks and trailers behind the wheels thereof to protect vehicles following the truck or trailer from rocks and other debris being thrown from the wheels of the truck or trailer.

Weights have been attached to the mud flaps to reduce the amount of flapping of the mud flaps due to wind currents. However, the prior art weighted mud flaps are believed to be less than effective. Further, to the best of Applicants' knowledge, the prior art mud flaps do not satisfactorily prevent the curling of the mud flaps. The curling of the mud flaps reduces their effectiveness and detracts from the appearance of the mud flap. Additionally some of the prior art weighted mud flaps require that the weight be embedded in the mud flap during the manufacturing of the mud flap. Further, the prior art weights for mud flaps are not easily attached to the mud flap. Applicants previously received U.S. Pat. No. 10,023,242 entitled MUD FLAP WEIGHT. Although Applicants' previous mud flap weight has met with considerable success, it has been found that the second support member or plate 64 of the '242 patent may not be necessary. Further, if the plate 64 of the mud flap weight of the '242 patent is eliminated, the cost of manufacturing the mud flap weight of the invention of the '242 patent is reduced.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A weight for a mud flap is disclosed with the mud flap having an upper end, a lower end, a first side, a second side, a forward side and a rearward side with the mud flap being secured to a truck, vehicle or trailer rearwardly of a wheel thereof. The weight includes an elongated support member having a vertically disposed rear wall with a first end, a second end, an upper end, a lower end, a forward side and a rearward side. The support also includes a horizontally disposed lower wall having a first end, a second end, a lower end, a rearward end, an upper side and a lower side with the rearward end of the lower wall being joined to the lower end of the rear wall and extending forwardly therefrom. In the preferred embodiment, a vertically disposed flange extends upwardly from the forward end of the lower wall of the support member.

In the preferred embodiment, the lower wall of the first support member has a plurality of horizontally spaced-apart slots or openings formed therein to permit water to drain downwardly therethrough.

A plurality of spaced-apart bolts, having a threaded end and a head end, extend through the rear wall of the support member and through the lower end of the mud flap. Nuts are threadably secured to the threaded ends of the bolts to secure the support member to the lower end of the mud flap. In the preferred embodiment, the support member is comprised of metal.

The positioning of the support member with respect to the lower end of the mud flap may be reversed wherein the support member is positioned forwardly of the mud flap.

It is therefore a principal object to provide an improved weight for a mud flap for a vehicle such as a truck or trailer.

A further object of the invention is to provide a weight which may be easily and securely attached to the lower end of a mud flap.

A further object of the invention is to provide a weight for a mud flap which prevents curling of the mud flap.

A further object of the invention is to provide a weight for a mud flap which reduces the flapping action of the mud flap due to wind currents.

A further object of the invention is to provide a weight for a mud flap which is economical of manufacture, durable in use and refined in appearance.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
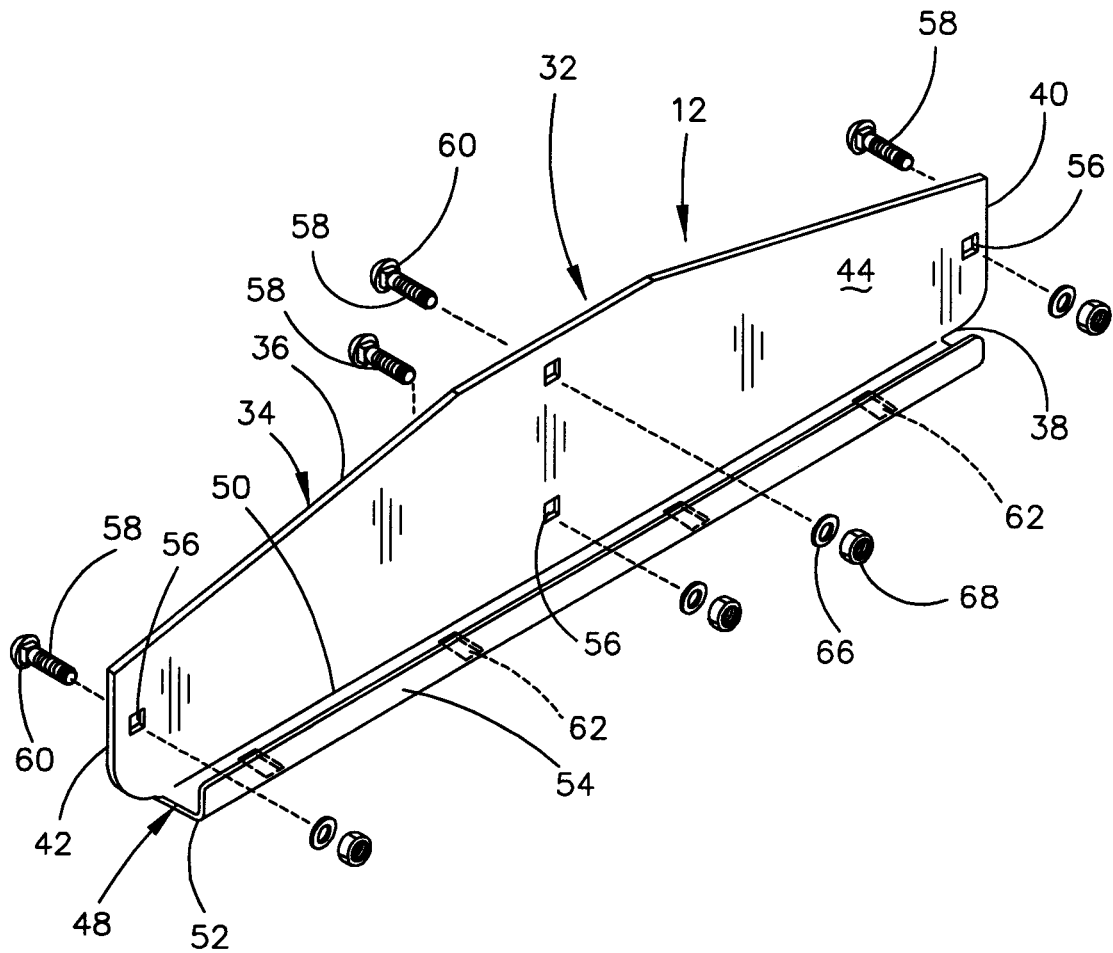
FIG. 1 is an exploded perspective view of the mud flap weight.
Figure 2:
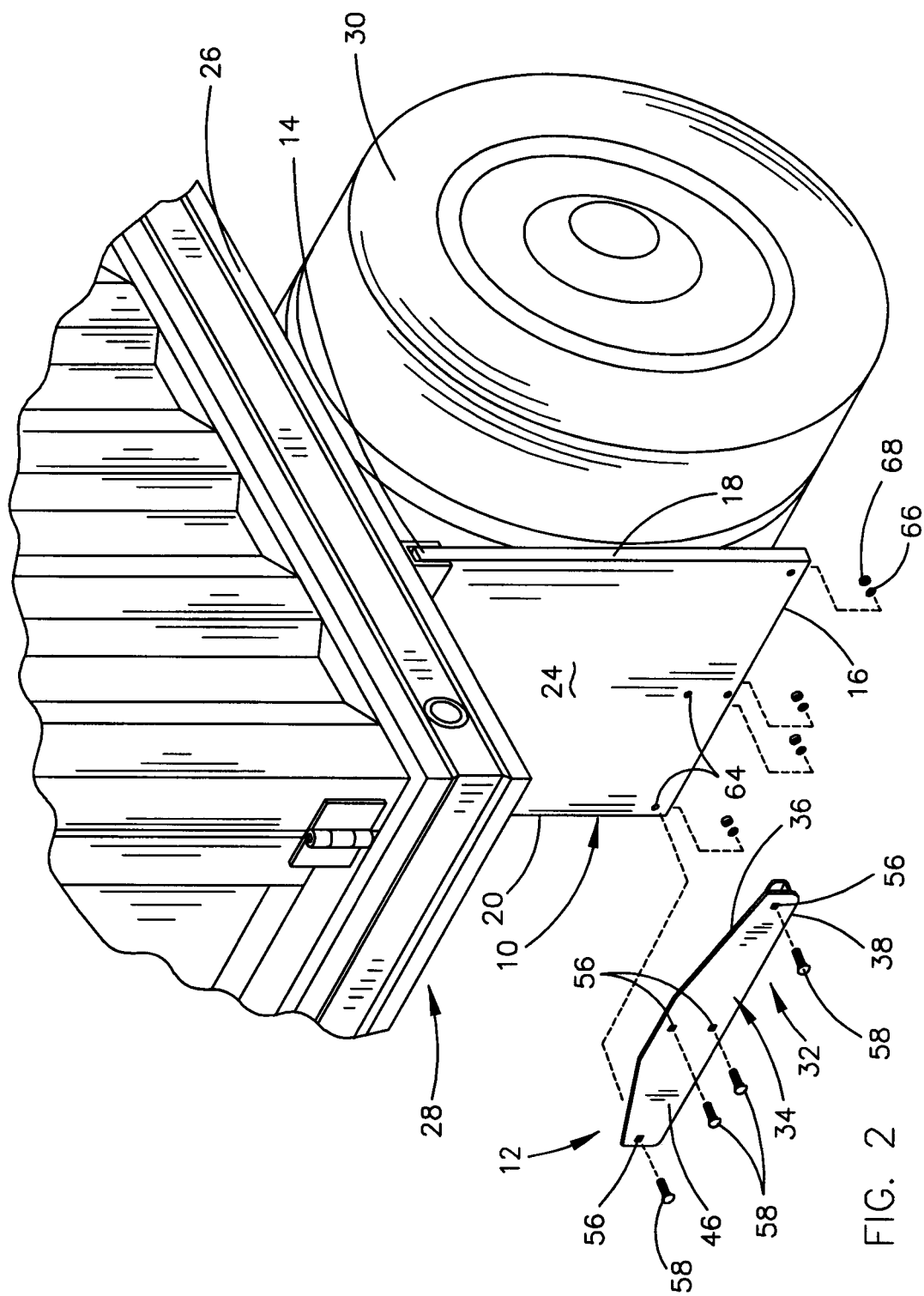
FIG. 2 is an exploded partial rear perspective view of the mud flap weight of this invention secured to the lower end of a mud flap which is positioned rearwardly of a wheel of a truck, trailer or vehicle.
Figure 3:
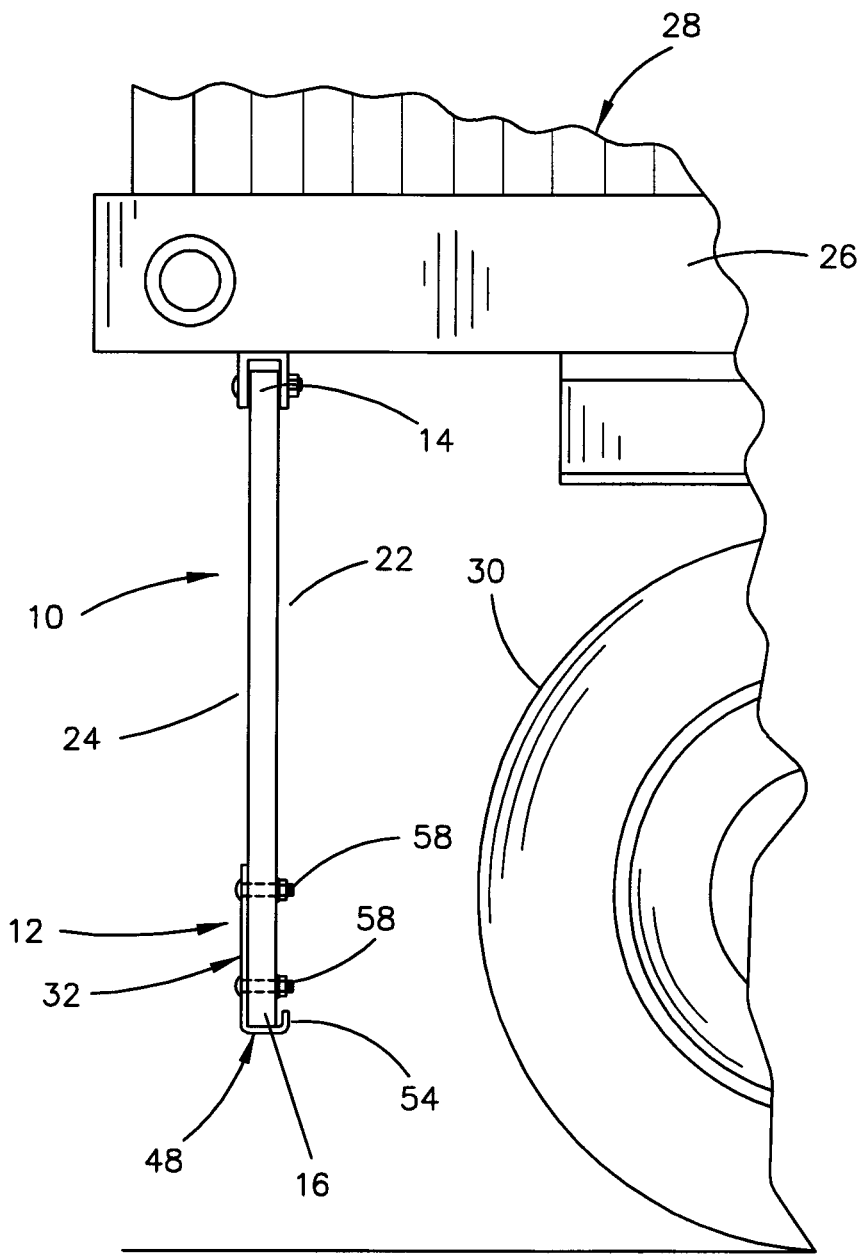
FIG. 3 is a partial side view of the mud flap weight of this invention secured to the lower end of a mud flap which is positioned rearwardly of a wheel of a truck, trailer or vehicle.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The weight for a mud flap 10 of this invention is designated by the reference numeral 12. Mud flap 10 is conventional in design and includes an upper end 14, a lower end 16, a first side 18, a second side 20, a front side 22 and a rear side 24. The upper end 14 of the mud flap 10 is attached to the frame 26 of a truck, trailer or vehicle 28 in conventional fashion. Mud flap 10 is positioned rearwardly of a wheel 30. The mud flap 10 is comprised of conventional materials such as rubber, thermoplastic materials, etc.

Weight 12 includes a support member 32. Support member 32 includes a rear wall 34, having an upper end 36, a lower end 38, a first end 40, a second end 42, a front side 44 and a rear side 46. Support member 32 includes a lower wall 48 having a rear end 50 and a front end 52. As seen, the rear end 50 of lower wall 48 is joined to the lower end 38 of rear wall 34 and extends forwardly therefrom. An upstanding flange 54 extends upwardly from the forward end 52 of lower wall 48. Although it is preferred that flange 54 be provided, there are some instances where the flange 54 may be omitted. It is preferred that support member 32 be of one-piece construction. Support member 32 is comprised of a metal material such as steel, stainless steel, iron, etc. Rear wall 34 includes a plurality of square bolt openings 56 formed therein in a spaced-apart manner. Each of the openings 56 is adapted to have a carriage bolt 58 extending therethrough. When the carriage bolt 58 is positioned in an opening 56, the square neck portion 60 of the bolt 58 will be received in the square bolt opening 56. A plurality of optional horizontally spaced-apart drainage openings 62 are formed in lower wall 48 at the front end 52 of lower wall 48.

The weight 12 is secured to the lower end of the mud flap as will now be described. The rear wall 44 of the support member 32 is positioned rearwardly of the mud flap 10 so that the lower end of the mud flap 10 is positioned on the upper surface of the lower wall 48 of the support member 32. A pen or some other type of marking device is then extended through the square bolt openings 56 from the rearward side thereof to indicate where holes 64 will be drilled in the mud flap 10. The support member 32 is then positioned at the rearward side of the mud flap 10 so that the square bolt openings 56 register with the holes 64 drilled in the mud flap 10.

Bolts 58 are then extended forwardly through the square bolt openings 56 so that the square necks 60 of the bolts 58 are received in the square openings 56 which prevents the bolts 58 from being rotated when the nuts are to be secured. The bolts 58 are then extended through the holes 64 in the mud flap 10. Washers 66 and nuts 68 are then threadably mounted on the forward ends of the bolts 58 to securely position the weight 12 on the lower end of the mud flap 10.

Figure 4:
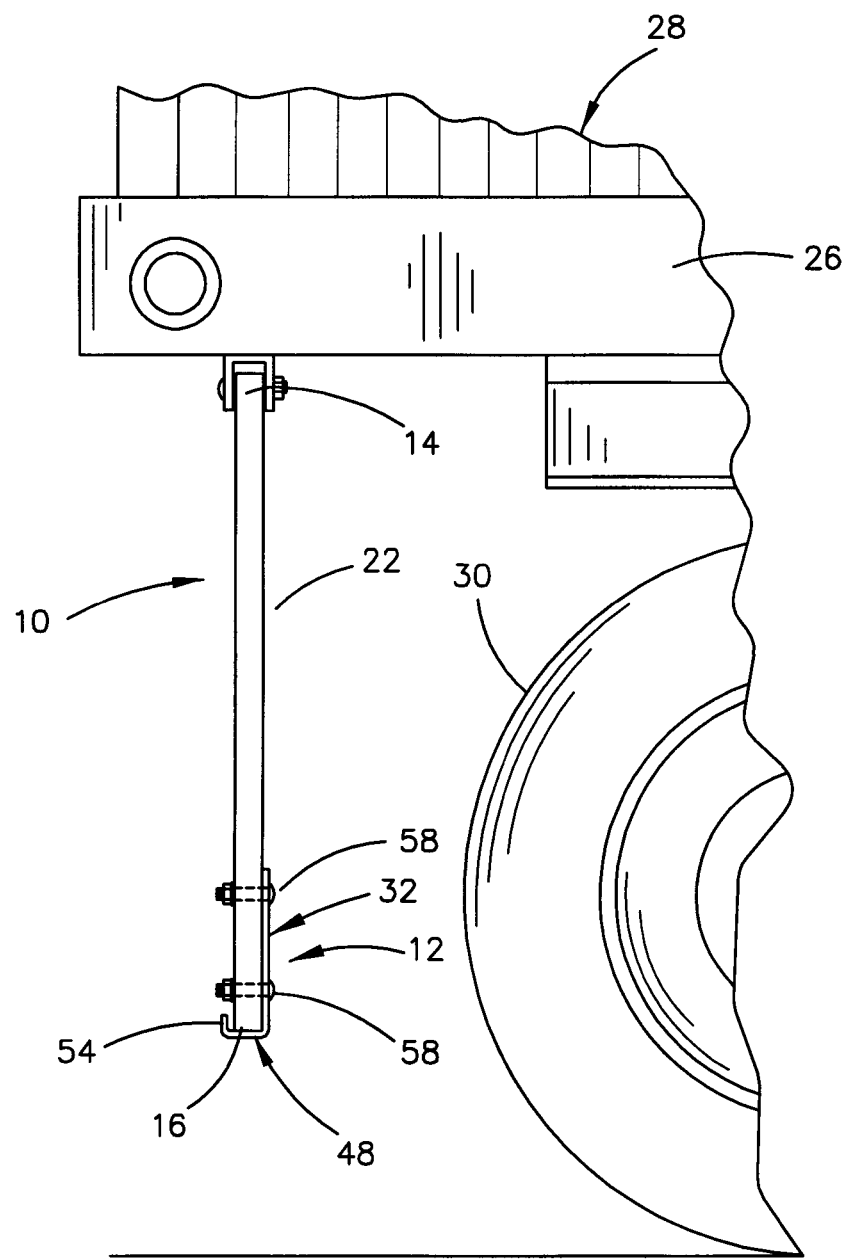
FIG. 4 is a partial side view similar to FIG. 3 except that the support member is positioned at the forward side of the mud flap.

As seen in FIG. 4, the weight 12 may also be positioned on the mud flap 10 as seen therein wherein the wall 34 of the support member 32 is positioned at the forward side of the mud flap 10 and whereby the flange 54 is positioned at the rearward end of the mud flap. In that position, the support member 32 is positioned at the front side of the mud flap 10.

There are some instances when the flange 54 may not be utilized although it is preferred that the flange 54 be provided.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A weight for a rubber mud flap having an upper end, a lower end, a first side, a second side, a forward side and a rearward side with the rubber mud flap being secured to a truck, vehicle or trailer rearwardly of a wheel thereof, which prevents the curling of the rubber mud flap, comprising:
   an elongated support member including:
   (a) a vertically disposed rear wall having a first end, a second end, an upper end, a lower end, a forward side and a rearward side;
   (b) a horizontally disposed lower wall having a first end, a second end, a forward end, a rearward end, an upper side and a lower side;
   (c) said rearward end of said lower wall being joined to said lower end of said rear wall and extending forwardly therefrom;
   a plurality of spaced-apart bolts, having a threaded end and a head end, extending forwardly through said rear wall of said support member and the lower end of the rubber mud flap;
   each of said plurality of spaced-apart bolts having a washer mounted thereon which is positioned forwardly of the rubber mud flap and which is in direct engagement with the forward side of the rubber mud flap; and
   nuts threadably secured to said threaded ends of said bolts forwardly of said washers to secure said support member to the lower end of the rubber mud flap.

2. A weight for a rubber mud flap having an upper end, a lower end, a first side, a second side, a forward side and a rearward side with the rubber mud flap being secured to a vehicle or trailer rearwardly of a wheel thereof, comprising:
   an elongated support member including:
   (a) a vertically disposed front wall having a first end, a second end, an upper end, a lower end, a forward side and a rearward side;
   (b) a horizontally disposed lower wall having a first end, a second end, a forward end, a rearward end, an upper side and a lower side;
   (c) said forward end of said lower wall being joined to said lower end of said front wall and extending rearwardly therefrom;
   a plurality of spaced-apart bolts, having a threaded end and a head end, extending rearwardly through said front wall of said support member and the lower end of the rubber mud flap;
   each of said plurality of spaced-apart bolts having a washer mounted thereon which is positioned rearwardly of the rubber mud flap and which is in direct engagement with the rearward side of the rubber mud flap; and
   nuts threadably secured to said threaded ends of said bolts rearwardly of said washers to secure said support member to the lower end of the rubber mud flap.

3. A weight for a thermoplastic mud flap having an upper end, a lower end, a first side, a second side, a forward side and a rearward side with the thermoplastic mud flap being secured to a truck, vehicle or trailer rearwardly of a wheel thereof, which prevents the curling of the thermoplastic mud flap, comprising:
   an elongated support member including:
   (a) a vertically disposed rear wall having a first end, a second end, an upper end, a lower end, a forward side and a rearward side;
   (b) a horizontally disposed lower wall having a first end, a second end, a forward end, a rearward end, an upper side and a lower side;
   (c) said rearward end of said lower wall being joined to said lower end of said rear wall and extending forwardly therefrom;

a plurality of spaced-apart bolts, having a threaded end and a head end, extending forwardly through said rear wall of said support member and the lower end of the thermoplastic mud flap;

each of said plurality of spaced-apart bolts having a washer mounted thereon which is positioned forwardly of the thermoplastic mud flap and which is in direct engagement with the forward side of the thermoplastic mud flap; and nuts threadably secured to said threaded ends of said bolts forwardly of said washers to secure said support member to the lower end of the thermoplastic mud flap.

4. A weight for a thermoplastic mud flap having an upper end, a lower end, a first side, a second side, a forward side and a rearward side with the thermoplastic mud flap being secured to a vehicle or trailer rearwardly of a wheel thereof, comprising:

an elongated support member including:

(a) a vertically disposed front wall having a first end, a second end, an upper end, a lower end, a forward side and a rearward side;

(b) a horizontally disposed lower wall having a first end, a second end, a forward end, a rearward end, an upper side and a lower side;

(c) said forward end of said lower wall being joined to said lower end of said front wall and extending rearwardly therefrom;

a plurality of spaced-apart bolts, having a threaded end and a head end, extending rearwardly through said front wall of said support member and the lower end of the thermoplastic mud flap;

each of said plurality of spaced-apart bolts having a washer mounted thereon which is positioned rearwardly of the thermoplastic mud flap and which is in direct engagement with the rearward side of the thermoplastic mud flap; and nuts threadably secured to said threaded ends of said bolts rearwardly of said washers to secure said support member to the lower end of the thermoplastic mud flap.

\* \* \* \* \*